(12) United States Patent  (10) Patent No.: US 8,482,779 B2
Shinohara  (45) Date of Patent: Jul. 9, 2013

(54) REDUCING REDUNDANCY OF PROCESSING BY ACQUIRING IMAGE CORRECTION OR A PARAMETER THAT HAS BEEN ALREADY PERFORMED AT ANOTHER APPARATUS

(75) Inventor: Hiroshi Shinohara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 291 days.

(21) Appl. No.: 12/964,530

(22) Filed: Dec. 9, 2010

(65) Prior Publication Data

US 2011/0267646 A1  Nov. 3, 2011

(30) Foreign Application Priority Data

Apr. 30, 2010  (JP) ................. 2010-105626

(51) Int. Cl.
*G06F 3/12* (2006.01)

(52) U.S. Cl.
USPC ........................................ 358/1.15

(58) Field of Classification Search
USPC .............. 358/1.1, 1.2, 1.9, 1.15, 1.16, 1.18
See application file for complete search history.

(56) References Cited

U.S. PATENT DOCUMENTS

2005/0254088 A1* 11/2005 Park et al. .................. 358/1.16
2007/0146777 A1*  6/2007 Cranitch et al. ............ 358/1.15

FOREIGN PATENT DOCUMENTS

JP  2006-172333 A  6/2006

* cited by examiner

*Primary Examiner* — Eric A Rust
(74) *Attorney, Agent, or Firm* — Canon USA Inc. IP Division (57) ABSTRACT

An image processing apparatus includes a reception unit configured to receive an image and a correction instruction with respect to the image; an acquisition unit configured to acquire a history of image processing performed to the image from the image; an update unit configured to update the correction instruction based on the history; and an image processing unit configured to perform processing indicated by the correction instruction updated by the update unit to the image.

9 Claims, 10 Drawing Sheets

<INTEGRATION SETTING>

801 —
- ○ PERFORM INTEGRATION ONLY WHEN CORRECTION ERROR OCCURS
- ● ALWAYS PERFORM INTEGRATION
- ○ DO NOT PERFORM INTEGRATION

[ OK ]  [ RETURN ]

<CORRECTION PROCESS ITEM SETTING>

802 —

| | EXECUTE | REQUIRED | SKIP |
|---|---|---|---|
| BEAUTIFUL SKIN CORRECTION | ✓ | ☐ | ☐ |
| NOISE CORRECTION | ✓ | ✓ | ☐ |
| RED-EYE CORRECTION | ☐ | ☐ | ✓ |
| SCENE CORRECTION | ✓ | ✓ | ☐ |
| SHARPNESS | ☐ | ☐ | ☐ |

[ OK ]  [ RETURN ]

FIG.9

| 301 | CORRECTION INSTRUCTION | NOISE REMOVAL | BEAUTIFUL SKIN CORRECTION | SCENE CORRECTION |
|---|---|---|---|---|
| | PROCESS HISTORY | RED-EYE CORRECTION | | |

| 302 | CORRECTION INSTRUCTION | NOISE REMOVAL | RED-EYE CORRECTION | BACKLIGHT CORRECTION |
|---|---|---|---|---|
| | PROCESS HISTORY | BEAUTIFUL SKIN CORRECTION | | |

| 303 | CORRECTION INSTRUCTION | NOISE REMOVAL | SCENE CORRECTION |
|---|---|---|---|
| | PROCESS HISTORY | RED-EYE CORRECTION | BEAUTIFUL SKIN CORRECTION |

FIG.10

| PROCESS CONTENT | DETECTION | CORRECTION | OMISSIBLE |
|---|---|---|---|
| RED-EYE CORRECTION | | ○ | |
| COLOR REPLACEMENT | | ○ | |
| PUPIL AREA EXTRACTION | ○ | | |
| FACE AREA EXTRACTION | ○ | | ○ |
| SKIN COLOR AREA EXTRACTION | ○ | | ○ |

REDUCING REDUNDANCY OF PROCESSING BY ACQUIRING IMAGE CORRECTION OR A PARAMETER THAT HAS BEEN ALREADY PERFORMED AT ANOTHER APPARATUS

BACKGROUND OF THE INVENTION

1. Field of the Invention

The present invention relates to an image processing apparatus, an image processing method, a printing system, and a computer-readable storage medium which perform image processing.

2. Description of the Related Art

In a printing system which involves image correction processing such as a print order processing system discussed in Japanese Patent Application Laid-Open No. 2006-172333, processes are sometimes divided to a plurality of apparatuses so that a load of the processes is distributed.

In many cases, image correction processing includes a series of processes, i.e., first determining whether there is a correction target, second extracting a parameter required for the correction processing, and finally correcting an image with use of the extracted parameter. (The process for determining where there is a correction target may be omissible depending on a type of correction processing.) For example, red-eye correction for correcting red-eye phenomenon (a phenomenon in that eyes of a subject become red in a photograph due to shooting with use of, for example, a flash of a camera) is performed in the following manner. It is determined by face detection whether there is a face in an image. If there is a face, a position and a size of a pupil are extracted as parameters. Then, the reddened pupil is replaced with a color prepared in advance based on the extracted parameters.

A printer discussed in Japanese Patent Application Laid-Open No. 2006-172333 is not configured to acquire information indicating, for example, what kind of parameter has been acquired from image data at another apparatus, or what kind of processing has been performed on the image data. Therefore, there is a possibility that the printer may redundantly perform processing that has already been performed at the other apparatus, and it contributes to reduced processing efficiency of the whole system.

Further, in the system discussed in Japanese Patent Application Laid-Open No. 2006-172333, a customer's personal computer (PC) also performs correction processing to an image acquired by, for example, a digital camera. Since image data input from a digital camera is often already coded into a Joint Photographic Experts Group (JPEG) format or the like, such an image needs to be decoded for correction processing. However, repetition of coding and decoding may deteriorate an image quality. Therefore, it is preferable to transmit a corrected image without applying high-compression coding to another image processing apparatus. However, performing image correction at an early stage of a system leads to an increase in a traffic amount between the image processing apparatuses.

SUMMARY OF THE INVENTION

According to the present invention, it is possible to reduce redundancy of execution of processing to improve processing efficiency of a system, since the system is configured to acquire image correction or a parameter that has been already performed at another image processing apparatus.

Further, according to the present invention, it is possible to effectively disperse a load of image correction processing to improve the processing efficiency of the system, while preventing deterioration of image quality due to coding and reducing an increase in a traffic amount.

An image processing apparatus includes a reception unit configured to receive an image and a correction instruction with respect to the image, an acquisition unit configured to acquire a history of image processing performed to the image from the image, an update unit configured to update the correction instruction based on the history, and an image processing unit configured to perform processing indicated by the correction instruction updated by the update unit to the image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

It should be understood, however, that relative arrangements of components, shapes of apparatuses and the like described in the exemplary embodiments are merely an example, and the intention is not to limit the scope of the present invention thereto.

Further, as used in the specification and the claims, the term "printer" may include not only a dedicated apparatus specialized for the printing function but also a multifunction peripheral capable of exerting the printing function and other functions, a manufacturing apparatus capable of generating an image and a pattern on recording paper, and the like.

Figure 2:
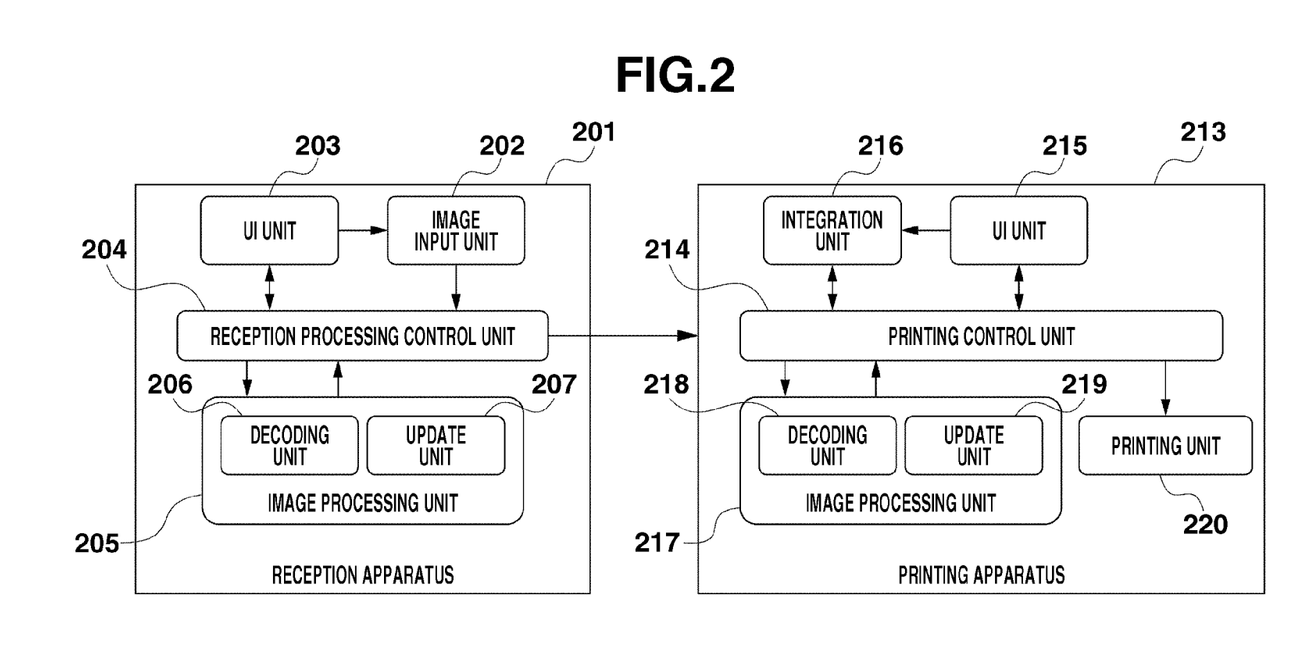
FIG. 2 is a block diagram illustrating a configuration of a printing system according to the exemplary embodiment of the present invention.

FIG. 2 is a block diagram schematically illustrating a configuration of a printing system according to an exemplary embodiment of the present invention. The printing system illustrated in FIG. 2 includes a reception apparatus 201 for receiving an image to be printed and a print request from a user, and a printing apparatus 213 for printing the image which the user instructs the printing system to print. The reception apparatus 201 and the printing apparatus 213 are communicably connected to each other via a communication network such as the Internet (hereinafter referred to as "network"). The apparatuses 201 and 213 include an image processing unit 205 (first image processing unit) and an image processing unit 217 (second image processing unit), respectively. Processing of an input image is divided to the plurality of image processing units 205 and 217 and processed thereby, and then the processed image is printed by a printing unit 220.

The reception apparatus 201 includes an image input unit 202, a user interface 203 (operation unit, hereinafter referred to as "UI unit"), a reception processing control unit 204, and the image processing unit 205. The reception apparatus 201 may include, for example, a personal computer (hereinafter abbreviated as "PC"), a photo printer, or a digital camera which a user manipulates.

The image input unit 202 is an input/output interface such as a scanner, a memory card reader, Bluetooth, or a universal serial bus (USB), and acquires image data from the outside. The UI unit 203 includes a touch panel, a button, and a keyboard, and receives an operation of a user and acquires a print request from the user. The print request includes a correction instruction indicating an image correction to be completed until the image is printed out. Even if a user does not explicitly set a correction instruction, for example, predetermined image correction may be set to the apparatus or the application by a default setting, and a default correction instruction may be issued unless a user changes the default setting.

A decoding unit 206 of the image processing unit 205 acquires the correction instruction from the UI unit 203, and further, interprets whether a processing history regarding an image correction and parameter acquirement, and a parameter acquired from the image are attached to the image data acquired from the image input unit 202 and acquires them. Then, the decoding unit 206 determines processing that the image processing unit 205 performs. The decoding unit 206 includes a dictionary for use in interpretation of metadata of various image formats for decoding an input image, and a document type definition (DTD) which will be described below.

For example, if an image acquired by the image input unit 202 is an image captured by a digital camera, the image may include a correction history indicating that a white balance correction, an exposure correction, a color correction, and the like have been performed. Further, in case of an image captured by a digital camera equipped with a face recognition function, for example, a position, a size, and the number of faces recognized as parameters may be attached to the image as metadata. Furthermore, in case of an image that has been processed by another PC, the image may be provided with information indicating that, for example, a red-eye correction, a color correction, a lightness correction, a saturation correction, a sharpness process, and a dodging process have been performed in addition to processing performed by a digital camera, as a correction history, and parameters related to each correction processing may be attached in association with the correction history.

An update unit 207 of the image processing unit 205 attaches, to an image data, a history of correction processing and detection processing that the image processing unit 205 has performed to image data, and a parameter related thereto.

For example, if the correction instruction indicates beautiful skin correction processing, skin color area detection processing and face detection processing are performed as the processing related to the beautiful skin correction processing, and parameters acquired from each detection processing are recorded by the update unit 207. A relationship between detection processing and correction processing can be figured out by referring to a division list (refer to FIG. 10) which will be described below.

The update unit 207 attaches a history indicating performed detection processing and correction processing along with parameters used in the correction processing to the image data in the eXtensible Markup Language (XML) format. Therefore, the decoding unit 206 stores a DTD which defines tags of XML, and interprets the content of a processing history written in XML by referring to the DTD. The update unit 207 may update the correction instruction acquired from the reception processing control unit 204, and may attach the updated instruction to the image data in the XML format, similar to the processing history.

The reception processing control unit 204 causes the image processing unit 205 to perform image processing, and then transmits the image data which the user requests to print, the correction instruction information, the updated correction history, and a parameter detected by the reception unit 201 to the printing apparatus 213 as a print job.

The printing apparatus 213 includes a UI unit 215, an integration unit 216, the image processing unit 217, and the printing unit 220.

Figure 8:
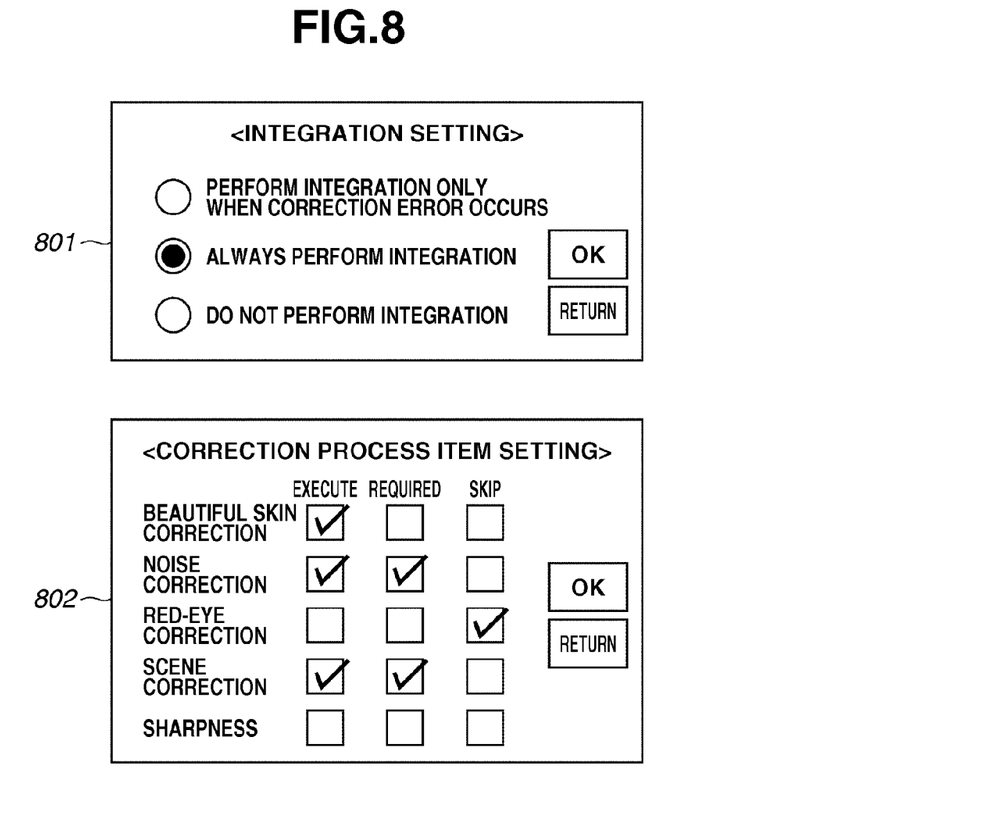
FIG. 8 illustrates a menu for setting a policy to be applied to correction processing items and a menu for setting the correction processing items.

Apparatus setting specific to the printing apparatus 213 is performed by the UI unit 215. As illustrated in FIG. 8, the apparatus setting indicates that any one of conditions "EXECUTE: execute if there is no history", "REQUIRED: always execute regardless of existence or absence of history", and "SKIP: do not execute at the apparatus itself" is set for each correction processing that the printing apparatus 213 can perform.

The integration unit 216 generates a correction instruction to be transmitted to the image processing unit 217 based on the correction instruction and the processing history that the printing control unit 214 has acquired from the reception apparatus 201, and the apparatus setting acquired from the UI unit 215. The integration unit 216 stores the above described DTD, and interprets the processing history that the update unit 207 has attached to the image data in the XML format. If the update unit 207 also writes the correction instruction in the XML format, the integration unit 216 needs to store the DTD which defines the correction instruction in the XML format.

The printing control unit 214 receives, from the reception apparatus 201, the image data which is a print target, the parameter used in the processing of the image data, and the correction instruction to the image data which is a print target. Then, the printing control unit 214 transmits, to the image processing unit 217, the correction instruction that the integration unit 216 has integrated for the image data along with the image data and the parameter.

The image processing unit 217 determines processing to be performed by the image processing unit 217 itself based on the acquired correction instruction, and performs the determined processing. The printing unit 220 prints the image to which the image correction by the image processing unit 217 has been completed. The printing apparatus 213 is embodied by a printer 100 illustrated in FIG. 1, the details of which will be described below.

Figure 3:
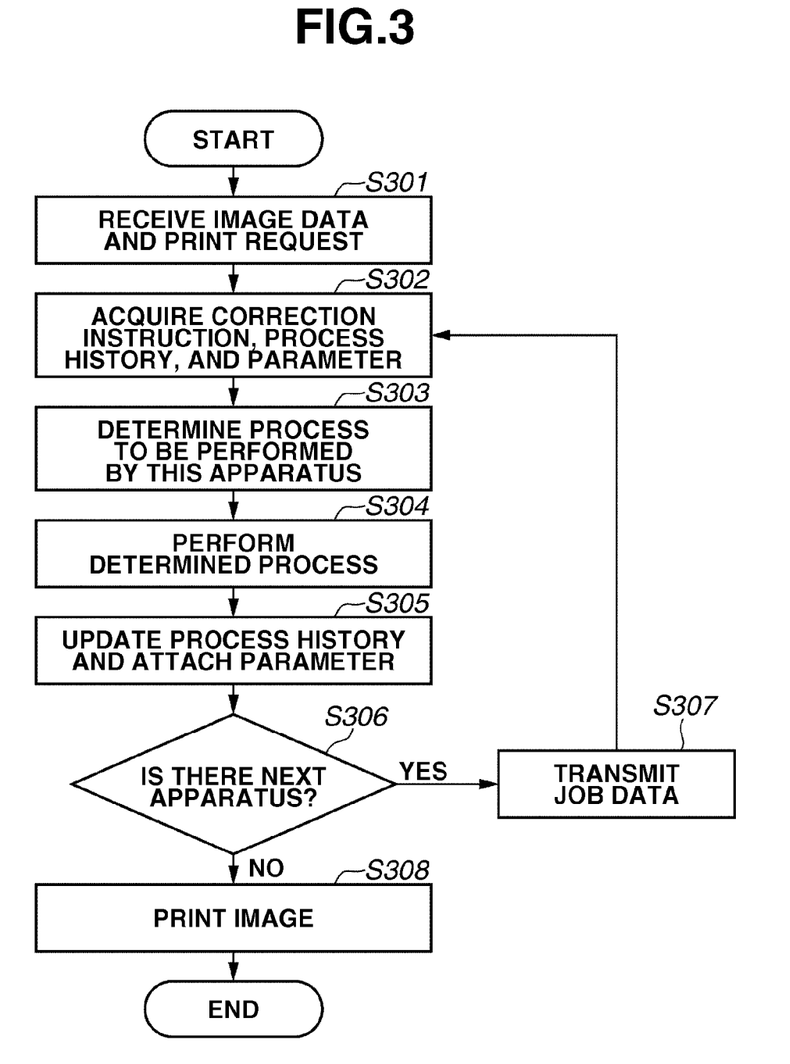
FIG. 3 is a flowchart illustrates integration processing of correction processing information.

Next, the outline of the processing of printing an image using the printing system illustrated in FIG. 2 will be described with reference to the flowchart illustrated in FIG. 3.

First, in step S301, the image input unit 202 of the reception apparatus 201 receives image data and a print request from a user. The print request contains a setting of the image correction that the user wants to apply to the image.

In step S302, the decoding unit 206 of the reception apparatus 201 acquires a correction instruction from the print request. Further, if the image data input from the image input unit 202 includes a processing history and a parameter attached thereto, the decoding unit 206 acquires the attached processing history and parameter.

Next, in step S303, the decoding unit 206 of the reception apparatus 201 determines processing to be performed by the apparatus (the image processing unit 205 in this case) based on the correction instruction, the processing history, and the parameter.

In step S304, the image processing unit 205 performs the processing determined by the decoding unit 206.

In step S305, the update unit 207 of the reception apparatus 201 updates the processing history based on the processing performed by the image processing unit 205, and attaches the updated processing history and the related parameter to the image data to which the processing has been performed.

In step S306, it is determined whether there is a next apparatus which is supposed to process the image to be printed. In this case, there is a next apparatus (the printing apparatus 213) which process the image (YES in step S306), thus the operation proceeds to step S307. In step S307, the reception processing control unit 204 transmits, to the printing apparatus 213 which is a latter stage, a print job including the image data that the user has requested the printing apparatus 213 to print, the correction instruction, the updated correction history, and the parameter detected by the reception apparatus 201.

At the printing apparatus side, the decoding unit 218, the update unit 219, and the image processing unit 217 performs the processing from the above described steps S302 to S306 (the detail description thereof are omitted).

In step S306, if there is no next apparatus which is supposed to process the image to be printed (NO in step S306), the operation proceeds to step S308 where the image processing unit 217 generates rendering data for printing, and the printing unit 220 prints the image based on the rendering data.

Figure 5:
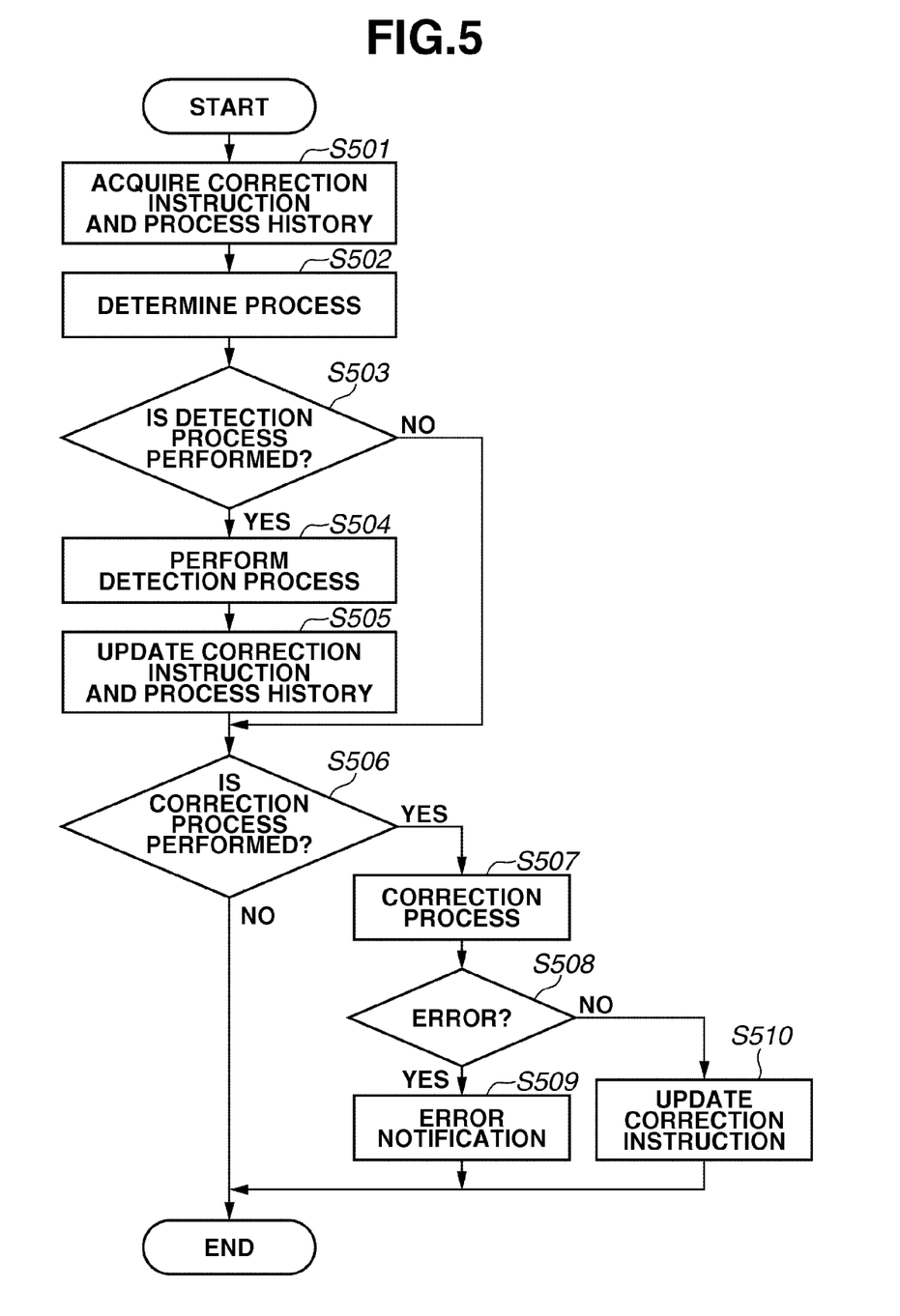
FIG. 5 is a flowchart illustrating processing performed by an image processing unit.

Next, the processing performed by the decoding unit 206 (or the decoding unit 218) will be described with reference to the flowchart illustrated in FIG. 5. First, in step S501, the decoding unit 206 reads the correction instruction and the processing history, and updates the correction instruction based on the processing history. In step S502, the decoding unit 206 determines detection processing and correction processing to be performed by the image processing unit 205 (or the image processing unit 217). A method for updating the correction instruction based on the processing history will be described in detail below.

As a method for determining which detection processing and correction processing to be performed by the image processing unit 205 (or 217) of the apparatus itself, detection processing related to correction processing indicated by the correction instruction is preferentially performed by the reception apparatus 201, and the remaining processing indicated by the correction instruction are performed by the printing apparatus 213. Alternatively, whether the image processing unit of that apparatus needs to perform processing may be determined based on, for example, processing loads on the respective apparatuses and a type of print job.

If the detection processing is included in the processing determined in step S502 (YES in step S503), the operation branches from step S503 to step S504, and the detection processing is performed to acquire a parameter. Further, in step S505, the processing history and the correction instruction are updated, and the acquired parameter is attached to the image. On the other hand, if no detection processing is determined as processing to be performed (NO in step S503), the operation proceeds to step S506.

In step S506, it is determined whether the correction processing is included in the processing determined in step S502. If it is determined that no correction processing included in the processing to be performed (NO in step S506), the operation is ended. On the other hand, if there is the correction processing in the processing determined in step S502 (YES in step S506), the operation proceeds to step S507 where that correction processing is performed.

Then in step S508, an output result of the correction processing is confirmed. If an error occurs (YES in step S508), the operation proceeds to step S509 and the error occurrence is notified to the reception processing control unit 204 (or the printing control unit 214) which will be described below. On the other hand, if no error occurs (NO in step S508), the operation proceeds to step S510 where the processing history is updated based on the performed correction processing, and then the operation is ended.

Figure 4:
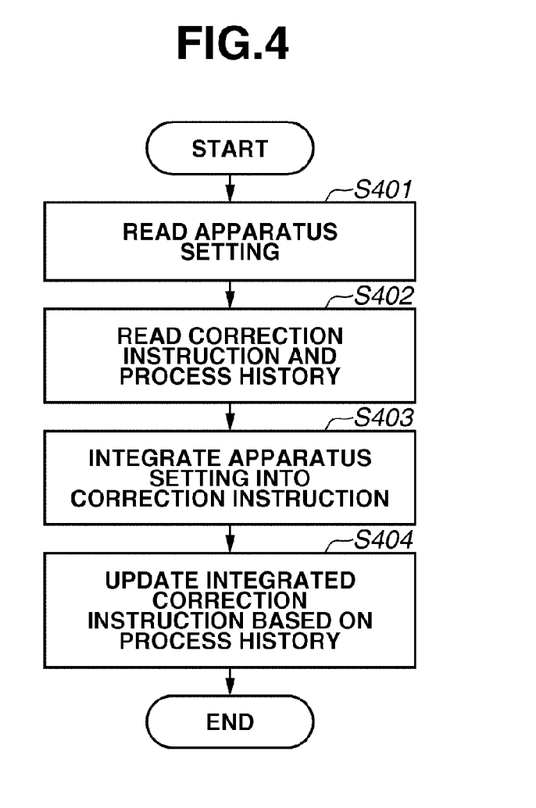
FIG. 4 is a flowchart illustrating the integration processing of the correction processing information.

Next, the processing that the integration unit 216 of the printing apparatus 213 updates the correction instruction by referring to the processing history and the correction instruction contained in the print job will be described below with reference to the flowchart illustrated in FIG. 4.

First, in step S401, the integration unit 216 acquires the apparatus setting. Subsequently, in step S402, the integration unit 216 reads the processing history and the correction instruction (a table 302) contained in the print job. Then, in step S403, the integration unit 216 integrates the apparatus setting to the correction instruction. In step S402, if there is no correction instruction attached to the print job, then in step S403, the content indicated in the apparatus setting is converted as the correction instruction.

Figure 9:
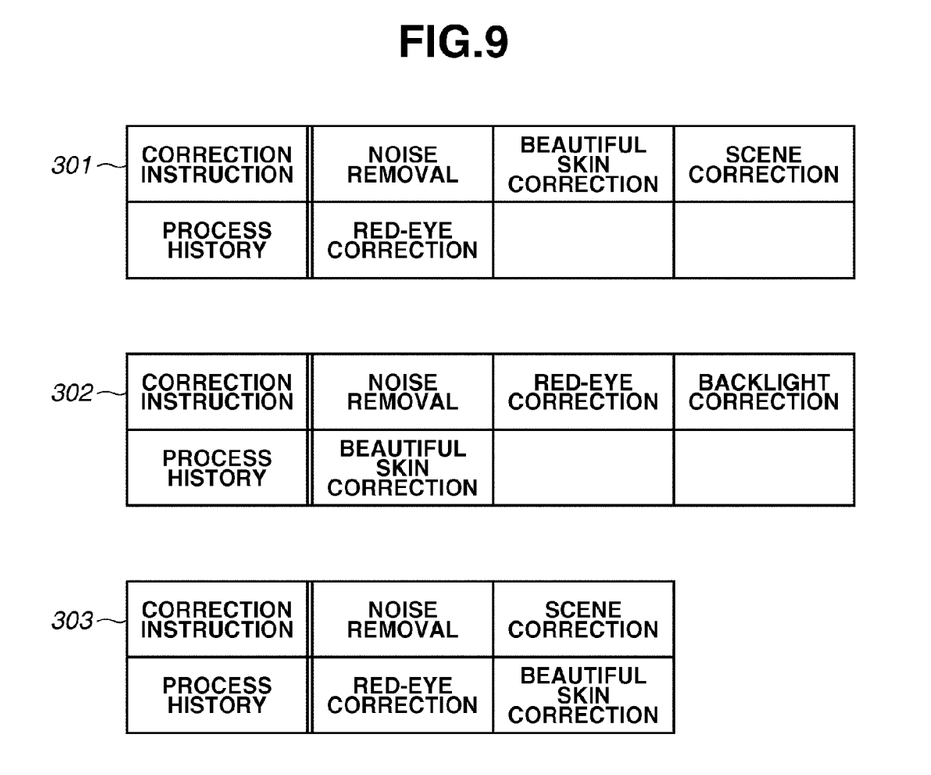
FIG. 9 illustrates an apparatus setting table, a job information table, and an integrated table.

Next, the processing of integrating the apparatus setting and the processing history (step S403 in FIG. 4), and the processing of updating the correction instruction based on the processing history (step S404 in FIG. 4) will be described in detail below with reference to FIG. 9. A table 301 illustrated in FIG. 9 is generated from an apparatus setting 802 illustrated in FIG. 8. The table 302 indicates the correction instruction and the processing history acquired by the integration unit 216 from the reception apparatus 201. A table 303 indicates the correction instruction and the processing history updated by the integration unit 216 based on the tables 302 and 301.

In the apparatus setting 802 illustrates in FIG. 8, "BEAUTIFUL SKIN CORRECTION", "NOISE REMOVAL (NOISE CORRECTION)", and "SCENE CORRECTION" are set as "EXECUTE", "NOISE CORRECTION" and "SCENE CORRECTION" are set as "REQUIRED", and further, "RED-EYE CORRECTION" is set as "SKIP", and these settings are stored. A condition is not set for "SHARPNESS". Based on the apparatus setting 802, the processing items set as "EXECUTE" and "REQUIRED" are converted as the correction instruction, and the processing items set as "SKIP" are converted as the processing history, so that an apparatus setting table 301 is generated. In the table 302, "NOISE REMOVAL", "BEAUTIFUL SKIN CORRECTION", and "BACKLIGHT CORRECTION" are set as items of "COR- RECTION INSTRUCTION", and "BEAUTIFUL SKIN CORRECTION" is set as an item of "PROCESSING HISTORY".

First, the integration unit 216 adds "NOISE REMOVAL" to "CORRECTION INSTRUCTION" of the table 303, since "NOISE REMOVAL" is set as the item of "CORRECTION INSTRUCTION" in the tables 301 and 302. On the other hand, "BEAUTIFUL SKIN CORRECTION" is set as the item of "CORRECTION INSTRUCTION" in table 301, but is set as the item of "PROCESSING HISTORY" in table 302. Therefore, the integration unit 216 adds "BEAUTIFUL SKIN CORRECTION" to "PROCESSING HISTORY" in the table 303. Similarly, "SCENE CORRECTION" is set as the item of "CORRECTION INSTRUCTION" in the table 301, but is set as neither the item of "CORRECTION INSTRUCTION" nor the item of "PROCESSING HISTORY" in the table 302. Therefore, the integration unit 216 adds "SCENE CORRECTION" to "CORRECTION INSTRUCTION" in the table 303. If the "REQUIRED" flag is set to "BEAUTIFUL SKIN CORRECTION, the integration unit 216 sets "BEAUTIFUL SKIN CORRECTION" to "CORRECTION INSTRUCTION" in the table 303, even if "BEAUTIFUL SKIN CORRECTION" is set as the item of "PROCESSING HISTORY" in the table 302.

Since "RED-EYE CORRECTION" is set as the item of "CORRECTION INSTRUCTION" in the table 302, the integration unit 216 adds "RED-EYE CORRECTION" to "PROCESSING HISTORY" in the table 303, so that the image processing unit 217 of the printing apparatus 213 skips "RED-EYE CORRECTION".

Further, "BACKLIGHT CORRECTION" is set as the item of "CORRECTION INSTRUCTION" in the table 302, while the apparatus setting 802 of the printing apparatus 213 does not include the item "BACKLIGHT CORRECTION". This means that the image processing unit 217 of the printing apparatus 213 is not provided with the backlight correction function.

Further, the integration unit 216 can arrange such that the correction instruction which has once caused an error is removed to be skipped by adding the correction instruction which has caused an error history to the processing history during the integration processing. To cause the integration unit 216 to add the correction instruction which has caused an error to the processing history to skip the correction instruction, the setting "PERFORM INTEGRATION WHEN CORRECTION ERROR OCCURS" is selected at the integration setting 801 in advance.

Figure 6:
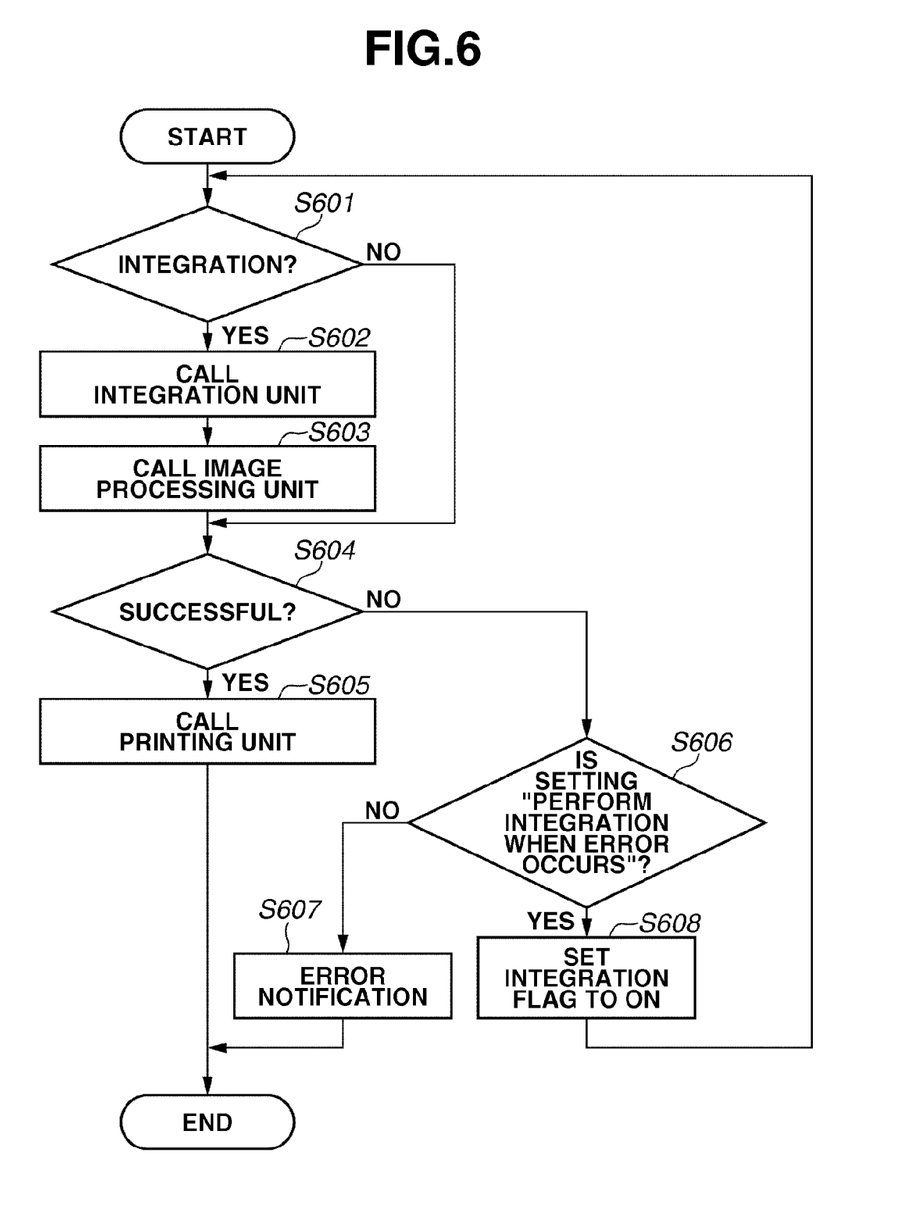
FIG. 6 is a flowchart illustrating processing performed by a printing control unit.

The outline of the processing performed by the printing control unit 214 when an error occurs will now be described with reference to the flowchart illustrated in FIG. 6. First, in step S601, it is determined whether the integration unit 216 performs correction instruction integration processing based on the integration setting 801 set by the UI unit 215 to the printing control unit 214. It should be noted that, in the integration setting 801, both "PERFORM INTEGRATION WHEN CORRECTION ERROR OCCURS" and "ALWAYS PERFORM INTEGRATION" can be concurrently selected. On the other hand, when "DO NOT PERFORM INTEGRATION" is selected, neither "PERFORM INTEGRATION WHEN CORRECTION ERROR OCCURS" nor "ALWAYS PERFORM INTEGRATION" can be selected.

If it is determined in step S601 that the correction instruction is integrated (YES in step S601), the operation proceeds to step S602 where the printing control unit 214 causes the integration unit 216 to perform the integration processing and acquires the updated correction instruction. In step S603, the printing control unit 214 calls the image processing unit 217 which then performs the processing indicated by the correction instruction updated in step S602. In step S604, it is determined whether the correction processing is successful. If the correction processing is successful (YES in step S604), the operation proceeds to step S605, and the printing control unit 214 calls the printing unit 220. The printing unit 220 prints the processed image, and then the printing processing is ended.

On the other hand, in step S604, if an error occurs in the correction processing (NO in step S604), the operation proceeds to step S606 where it is determined whether the setting of the integration setting 801 is "PERFORM INTEGRATION WHEN CORRECTION ERROR OCCURS".

If the setting of the integration setting 801 is not "PERFORM INTEGRATION WHEN CORRECTION ERROR OCCURS" (NO in step S606), the operation proceeds to step S607 and the printing control unit 214 notifies the UI unit 215 of the error occurrence, and the operation is ended. On the other hand, if the setting of the integration setting 801 is "PERFORM INTEGRATION WHEN CORRECTION ERROR OCCURS" (YES in step S606), the operation proceeds to step S608. In step S608, the integration flag is set to ON, and the operation returns to step S601. Setting the integration flag to ON causes the operation to proceed from step S601 to step S602 and thereby the integration processing to be performed. The correction instruction that has caused the error is added to the processing history by the integration unit 216 so that the image processing unit 217 skips the corresponding processing.

[Division of Processing]

Figure 10:
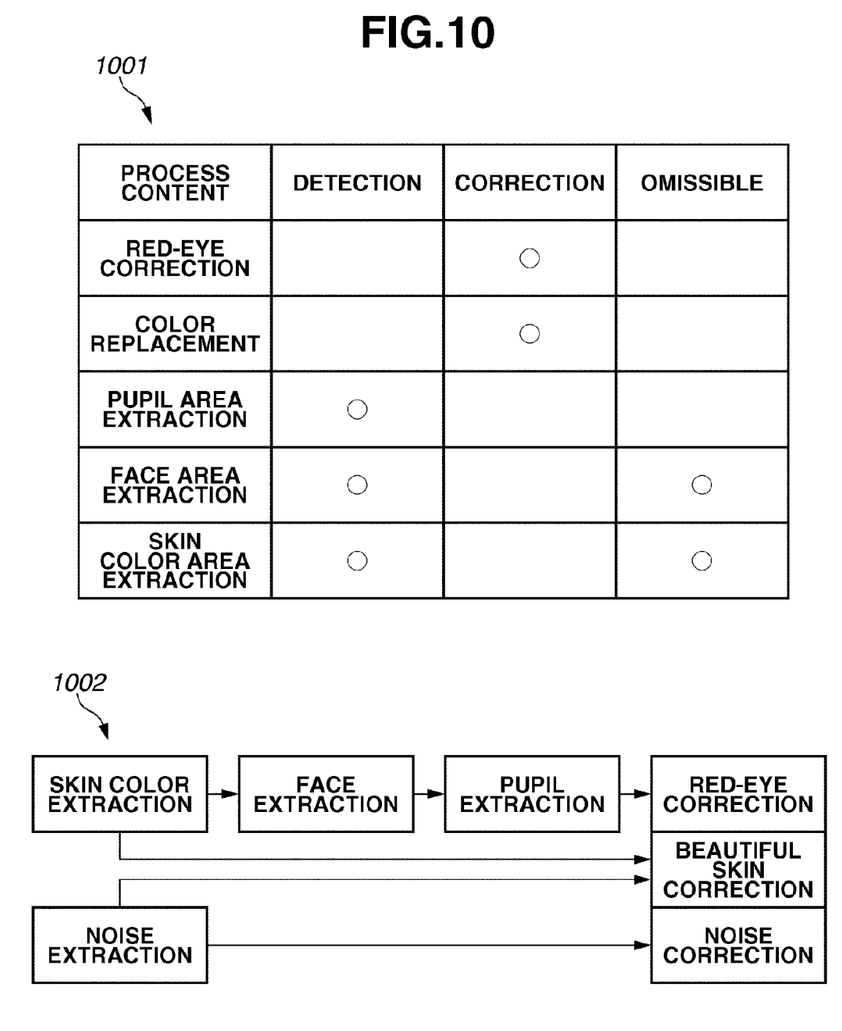
FIG. 10 illustrates an example of a division list indicating a correspondence between detection processing and correction processing.

The decoding unit 206 (or the decoding unit 218) determines processing to be performed by the apparatus of its own by referring to the division list which indicates a relationship between detection processing and correction processing. For this purpose, the decoding unit 206 (or the decoding unit 218) has the division list for dividing processing indicated by the correction instruction into a plurality of processing items. FIG. 10 illustrates a part of the division list (a division list 1001 of red-eye correction) and correspondence relationships 1002 when red-eye correction, beautiful skin correction, and noise correction are divided, respectively.

The division list includes processing items into which correction processing indicated by each correction instruction is divided, an order of execution of the processing, an attribute (correction or detection) of each divided processing, and a flag indicating whether the divided processing is omissible.

For example, as illustrated in the division list 1001, the red-eye correction can be divided into four processing items "COLOR REPLACEMENT", "PUPIL AREA EXTRACTION", "FACE AREA EXTRACTION", and "SKIN COLOR AREA EXTRACTION". The beautiful skin correction can be divided into three processing items "SKIN COLOR AREA EXTRACTION", "NOISE (DUST AND DIRT) EXTRACTION", and "CORRECTION BY INTERMEDIATE VALUE FILTER (not shown)". If the correction instruction acquired by the decoding unit 206 (or the decoding unit 218) includes "RED-EYE CORRECTION", the decoding unit 206 (or the decoding unit 218) searches the print job for the processing history of the red-eye correction, then continues the searches for the processing history of each of "PUPIL AREA EXTRACTION", "FACE AREA EXTRACTION", and "SKIN COLOR AREA EXTRACTION" in this order. If there is a corresponding processing history, the decoding unit 206 acquires a parameter related to the history, and transmits processing that is not yet performed among the divided processing items to the update unit 207 (or the update unit 219) as the correction instruction.

Then, the decoding unit 206 (or the decoding unit 218) determines which processing the image processing unit 205 (or the image processing unit 217) of the own apparatus is made to perform by referring to the attribute of the processing in the division list. Processing with the omissible flag set thereto may be skipped if there is no processing history and parameter related thereto. For example, for the red-eye correction, if a face area and a skin color area can be specified, an area where a pupil area is searched for can be narrowed down in advance and the processing can be speeded up, but execution of these areas is not always indispensable.

A use of such a division list enables recognition of detection processing that can be partially shared by a plurality of correction processing items. For example, the top row of the correspondence relationship 1002 indicates the relationship between the detection processing and the correction processing of the division list for the red-eye correction (arrows indicate the order of execution). Further, the correspondence relationship 1002 reveals that the skin color extraction processing can be used for the red-eye correction and the beautiful skin correction, and that the noise extraction processing can be used for the beautiful skin correction and the noise correction. Therefore, storing the division list for each correction processing enables detection processing used for each correction processing to be partially shared, thereby realizing further effective distributed processing. The integration unit 216 may store the division list and perform the same processing.

[Printing Apparatus]

Figure 1:
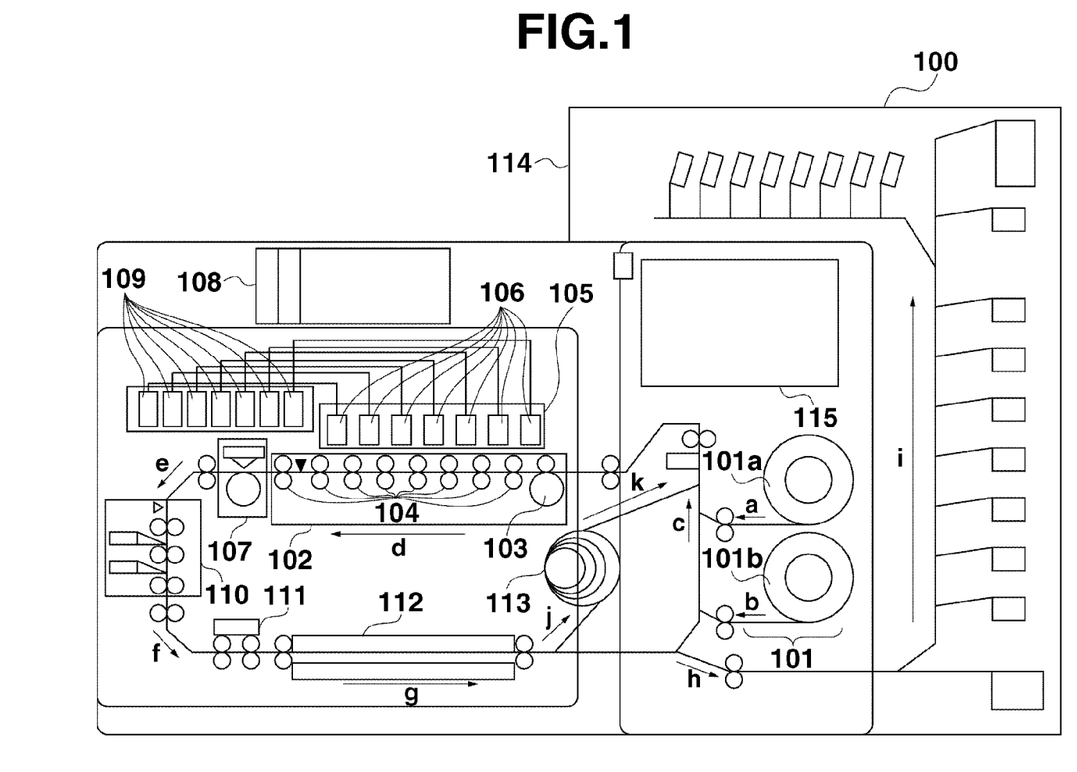
FIG. 1 is a cross-sectional view illustrating an overall configuration of a printing apparatus according to an exemplary embodiment of the present invention.

In the following, a structure of a printing apparatus will be described in detail. FIG. 1 schematically illustrates a structure of the printer 100 which uses a roll sheet (a continuously lengthened continuous sheet having a length in a conveyance direction that is longer than a print size) as a recording medium, partially in cross-section so that the inner structure thereof can be well understood. The printer 100 includes a roll sheet unit 101, a conveyance unit 102, a conveyance encoder 103, rotation rollers 104, a cutter unit 110, a sheet take-up unit 113, and a sorter unit 114 as a conveyance system. Further, the printer 100 includes a head unit 105, printing heads 106, a scanner unit 107, a control unit 108, ink tanks 109, a back surface printing unit 111, and a drying unit 112 as a printing system. Furthermore, the printer 100 includes an operation unit 115 as an operation system.

The control unit 108 includes a control unit provided with a controller, a user interface, and various input/output (I/O) interfaces, and is in charge of various types of control of the entire apparatus. Further, the control unit 108 includes the above described printing control unit 214 and image processing unit 217. If bitmap data is not transmitted while the printer 100 is in a continuously printable state after a page is printed out, the control unit 108 stops the conveyance system of the roll sheet lest the roll sheet is consumed in vain (sheets without any data thereon continue to be output).

The roll sheet unit 101 includes two cassettes, an upper sheet cassette 101*a* and a lower sheet cassette 101*b*. A user sets a roll sheet (hereinafter referred to as "sheet") by mounting the sheet onto a container and inserting it into the cassette of the printer 100 from the front of the cassette. The sheet pulled out from the upper sheet cassette 101*a* or the lower sheet cassette 101*b* by the roll sheet unit 101 is conveyed in the direction indicated by an arrow "a" or an arrow "b" as viewed in FIG. 1. The sheet from the roll sheet unit 101 advances in the direction indicated by an arrow "c" as viewed in FIG. 1 to reach the conveyance unit 102. The conveyance unit 102 includes a plurality of the rotation rollers 104, and conveys the sheet in the direction indicated by an arrow "d" (the horizontal direction) as viewed in FIG. 1. Two or more cassettes may be provided according to the number of types of roll sheet.

The head unit 105 is disposed so that the head unit 105 faces one surface of the sheet being conveyed, and generates an image on the sheet by discharging ink from nozzles of the printing heads 106 onto the sheet being conveyed based on the print data. The present exemplary embodiment is configured so that seven printing heads 106 are disposed along the d direction to enable even printing with use of up to seven types of inks. The ink tanks 109 independently contain inks of various colors. A method for discharging inks from the nozzles may be embodied by, for example, a method using heating elements, a method using piezoelectric elements, a method using electrostatic elements, or a method using micro electro mechanical system (MEMS) elements. Further, discharge timing of the printing heads 106 is determined by an output signal from the conveyance encoder 103.

The scanner unit 107 checks whether printing is normally performed or a state of the apparatus by reading a printed image and a special pattern (marker) on the sheet.

The sheet conveyed from the scanner unit 107 is conveyed in the direction indicated by an arrow "e", and the cutter unit 110 cuts the sheet per length of a predetermined print size if the sheet needs to be cut. The print size is determined in advance according to specification from a print mode, a user's instruction, or a size of an image to be printed. For example, when printing of only one side is completed in the two-sided printing mode, the sheet is not cut. Further, in case of printing an L-size photograph, the sheet is cut to have a length of 135 mm in the conveyance direction. In case of printing an A4-size sheet, the sheet is cut to have a length of 297 mm in the conveyance direction.

The sheet cut by the cutter unit 110 is conveyed in the direction indicated by an arrow "f" as viewed in FIG. 1, and the back surface printing unit 111 prints information (for example, a number for order management) for each printed image on the reverse surface of the printed surface of the sheet.

The drying unit 112 heats the sheet by hot air to dry the sheet with ink provided thereon in a short time. The sorter unit 114 includes a plurality of trays (22 trays in the present exemplary embodiment), and sorts conveyed sheets and stacks them onto set trays while checking them by a sensor. The sorter unit 114 selects a tray onto which sheets are stacked according to, for example, the length of the print size. Further, the sorter unit 114 indicates a condition such as stacking in progress or completion of stacking using, for example, a light-emitting diode (LED). The sorter unit 114 will be described in detail below.

The sheet take-up unit 113 takes up a sheet at which printing on one surface has been completed when the printer 100 is in the two-sided printing mode, and conveys the taken-up sheet in the direction indicated by an arrow "K" as viewed in FIG. 1 to enable printing on the back surface after printing on the one surface has been completed.

Further, the operation unit 115 receives an instruction from a user to change the settings of the printer 100 and check the condition. For example, the operation unit 115 notifies a user of which tray output printed products are stacked, a print mode of the printer 100 and the condition thereof (for example, ready for printing, print in progress, or completion), and maintenance information (for example, a remaining ink amount, a remaining sheet amount, and a time elapsed since last head cleaning).

Although the ink-jet image processing apparatus has been described in the above example, the present invention may be applied to not only a printing method with use of a toner instead of ink but also various printing methods. Examples of the printing methods include a thermal printer (for example, the dye sublimation type or the thermal transfer type), a dot impact printer, an LED printer, and a laser printer.

As described above, according to the present exemplary embodiment, it is possible to reduce redundancy of processing to improve the processing efficiency of the system.

Further, it is possible to prevent deterioration of the image quality due to coding and reduce an increase in a traffic amount between apparatuses, and effectively distribute a load of image correction processing to improve the processing efficiency of the system.

Figure 7:
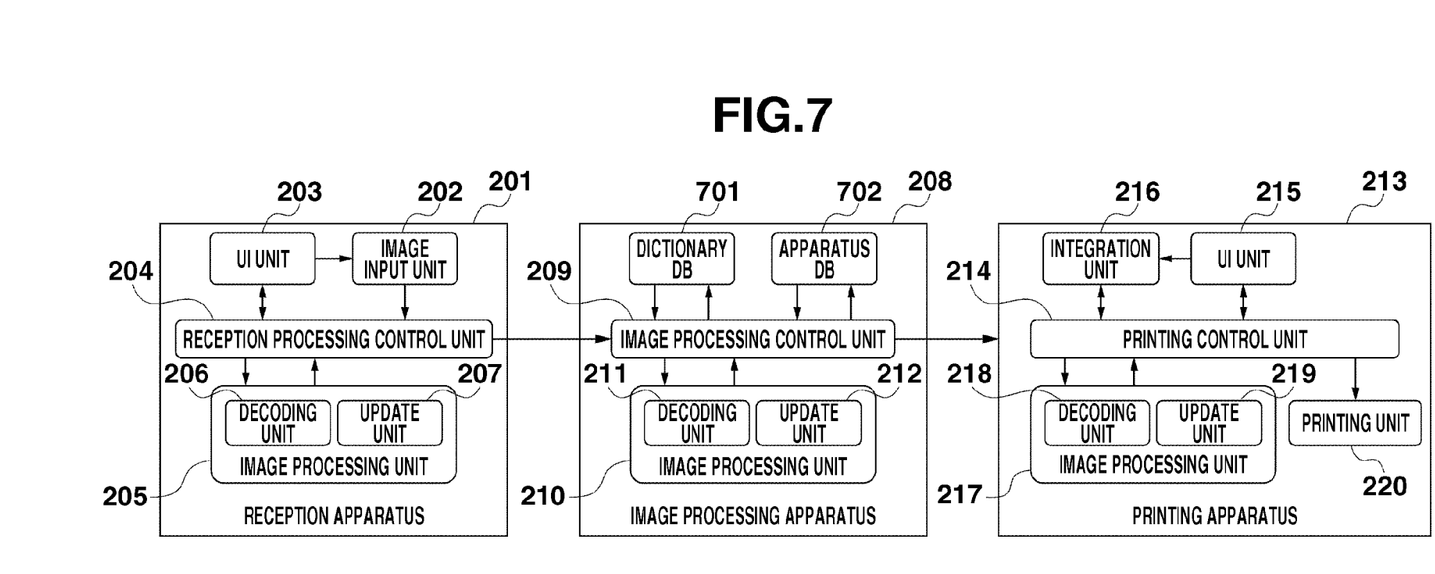
FIG. 7 is a block diagram illustrating a configuration of a printing system according to an exemplary embodiment of the present invention.

FIG. 7 schematically illustrates a configuration of a printing system according to another exemplary embodiment of the present invention. Components which have similar functions will be denoted by the same reference numerals as those in the above discussed exemplary embodiment, and the descriptions thereof will be omitted. In the printing system which will be described below, an image processing server 208 is disposed between the reception apparatus 201 and the printing apparatus 213. It is desirable that the image processing server 208 is configured to be usable for cloud computing.

The image processing server 208 includes a dictionary database 701 (dictionary storage unit, hereinafter referred to as "dictionary DB"), and may be capable of performing recognition processing more difficult than recognition processing that the reception apparatus 201 can perform. For example, the dictionary DB 701 includes a dictionary for detection of a whole body or a face of an animal other than a human being such as a dog and a cat. Due to the provision of the dictionary, it becomes possible to perform image correction for enhancing an edge or contrast of a detected target even if a subject is, for example, an animal. In addition, the image processing server 208 can perform more accurate detection processing by referring to the dictionary owned by the dictionary DB 701.

Therefore, a decoding unit 211 of the image processing server 208 can cause an image processing unit 210 to perform the detection processing preferable to be performed by referring to the dictionary, even if the detection processing has been performed by the reception apparatus 201.

Further, if the network between the image processing server 208 and the printing apparatus 213 has a more excellent data transfer rate than the data transfer rate of the network between the reception apparatus 201 and the image processing server 208, even if the correction processing is performed by the image processing server 208, the corrected image is transmitted to the printing apparatus 213 as it is without compressing. Further, the image processing server 208 can preferentially perform the correction processing for which high-level recognition processing with using the dictionary DB 701 is necessary.

The image processing server 208 includes an apparatus database 702 (hereinafter referred to as "apparatus DB 702") storing information related to a plurality of printing apparatuses including the printer 100 illustrated in FIG. 1. A use of the apparatus DB 702 enables the image processing server 208 to perform processing which is indicated by a correction instruction included in a print job from the reception apparatus 201 but cannot be performed by the printing apparatus 213 as an output destination since the printing apparatus 213 is not provided with a corresponding function. Further, the image processing server 208 may select the printing apparatus 213 capable of handling the processing indicated by the correction instruction included in the print job from the reception apparatus 201 and cause the selected printing apparatus 213 to output the print job.

In some cases, a parameter used in processing is required to have high accuracy depending on a type of the correction processing. In such a case, even if the detection processing has been already performed by the reception apparatus 201, the detection processing may be performed again by the printing apparatus 213.

In the above described exemplary embodiment, the reception apparatus 201 does not perform image correction processing except for the detection processing. However, the image processing unit 205 may perform reduction conversion of an image, if the reception apparatus 201 can acquire information indicating a print resolution of the printing apparatus 213 and resolution of the image input by the image input unit 202 is excessively high relative to the print resolution.

Further, the decoding unit may not search for a processing history, and the printing apparatus 213 may be provided with a special mode for processing an image based on image data included in a print job and the apparatus setting. For example, when a user's print request requires a normal print on an inexpensive A4-size copy sheet, since it can be understood that the print job does not have to perform many kinds of processing to the image data and search of the processing history may not be necessary, printing under the special mode can provide a sufficient result.

Further, a correction instruction received from the UI unit 203 may be converted into XML data by the reception processing control unit 204, and after that, the correction instruction and processing history may be written and managed in the XML format.

In the above described exemplary embodiment, the image processing unit 205 in the printing system performs only the detection processing of processing items indicated by the correction instruction from the UI unit 203 by way of example. However, the image processing unit 205 may perform image correction as long as a print request is not yet issued, like a commonly-used PC, a digital camera, and a photo printer.

In the above description, only the configuration in which integration is preformed in the printing apparatus 213 has been discussed. However, the integration unit may be provided to the reception apparatus 201 and the image processing server 208, and integration processing may be performed at the respective apparatuses. Further, the apparatus setting may be registered at the respective apparatuses.

In the above description, the integration processing has been described, assuming that a correction instruction and a processing history are converted into a table as illustrated in FIG. 9. However, this is merely to facilitate understanding of this processing. A correction instruction and a processing history may not be stored in the table format, and may not be converted to the table format at the time of integration processing.

In the above description, connection of information such as a correction instruction, a processing history, and a parameter to image data is expressed as the term "attached". However, such information may be inserted in metadata area of a format of image data, may be provided successively before or after image data, or may be just added to page description language (PDL) data including image data.

Further, the processing of the integration unit 216 may be omitted by changing the integration setting 801 to the "ALWAYS OMIT INTEGRATION" setting according to the content of the apparatus setting 802. For example, if there is no processing set in the apparatus setting 802, omission of the integration processing does not change the result. Therefore, in this case, the processing may be simplified by omitting the integration processing and causing the image processing unit 217 to process an image by directly reflecting the correction instruction from the reception apparatus 201 (or the image processing server 208). In addition, if there is only processing set to "NORMAL" in the apparatus setting 802, the integration processing may be omitted.

Alternatively, if the setting "ALWAYS OMIT INTEGRATION" is selected at the integration setting 801, the correction instruction acquired by the printing apparatus 213 may be invalidated, and the integration processing may be performed so that a new correction instruction can be generated from the apparatus setting.

Further, in the above description, for simplification of description, the processing history and the correction instruction are handled as clearly separated data. However, the processing history may be a flag included in each command indicated by the correction instruction. For example, if the correction instruction is written in the XML language, the processing history can be embodied by associating a flag indicating whether the processing has been already performed to a tag indicating a command included in the correction instruction.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-105626 filed Apr. 30, 2010, which is hereby incorporated by reference herein in its entirety.

What is claimed is:

1. An image processing apparatus comprising:
a reception unit configured to receive an image and a correction instruction with respect to the image;
a decoding unit configured to divide the correction instruction received by the reception unit into detection processing and correction processing, wherein a parameter is acquired by performing the detection processing to the image;
an acquisition unit configured to acquire a history of image processing performed to the image from the image;
an update unit configured to update the correction instruction based on the history;
an image processing unit configured to perform processing indicated by the correction instruction updated by the update unit to the image based on the parameter; and
a transmission unit configured to transmit the correction instruction and the image processed by the image processing unit to another image processing apparatus.

2. The image processing apparatus according to claim 1, wherein the acquisition unit acquires a parameter extracted from the image by the image processing having the history, and the image processing unit performs the processing indicated by the correction instruction to the image based on the parameter.

3. The image processing apparatus according to claim 1, wherein the update unit updates the correction instruction by deleting an instruction related to the processing that the image processing unit has performed, among the processing indicated by the correction instruction.

4. The image processing apparatus according to claim 1, wherein:
the reception unit includes an operation unit configured to input an apparatus setting; and
the image processing apparatus further comprises an integration unit configured to update the correction instruction based on the apparatus setting input by the operation unit and the history.

5. The image processing apparatus according to claim 1, further comprising a printing unit configured to print the image processed by the image processing unit.

6. The image processing apparatus according to claim 1, further comprising a dictionary storage unit configured to store a dictionary to be used in the detection processing,
wherein the image processing unit acquires the parameter by performing the detection processing to the image based on the dictionary storage unit.

7. The image processing apparatus according to claim 1, wherein the update unit updates the correction instruction into data written in eXtensible Markup Language (XML).

8. A non-transitory computer-readable storage medium storing a program causing a computer to function as an image processing apparatus according to claim 1.

9. A printing apparatus configured to print an image which is processed by an image processing apparatus, wherein:
the image processing apparatus comprises
an input unit configured to receive an image and a correction instruction with respect to the image,
a first image processing unit configured to perform at least one of a plurality of items of processing indicated by the correction instruction,
an update unit configured to update a processing history and the correction instruction with respect to the image based on the processing performed by the first image processing unit, and
a transmission unit configured to transmit the image to which the first image processing unit has performed the processing, and the processing history and the correction instruction updated by the update unit to the printing apparatus; and
the printing apparatus comprises
a second image processing unit configured to acquire the image, the processing history, and the correction instruction from the image processing apparatus, and perform processing to the image based on the correction instruction and the processing history, and
a printing unit configured to print the image processed by the second image processing unit.

* * * * *